United States Patent
Dorozhkin et al.

(10) Patent No.: US 8,407,965 B2
(45) Date of Patent: Apr. 2, 2013

(54) SYSTEM AND METHOD FOR CONSTRUCTION WALL PANELS

(76) Inventors: Sergey Evgenyevich Dorozhkin, Moscow (RU); Anton Yuryevich Chenzov, Moscow (RU)

( * ) Notice: Subject to any disclaimer, the term of this patent is extended or adjusted under 35 U.S.C. 154(b) by 357 days.

(21) Appl. No.: 12/902,846

(22) Filed: Oct. 12, 2010

(65) Prior Publication Data

US 2011/0099935 A1 May 5, 2011

(30) Foreign Application Priority Data

Oct. 30, 2009 (RU) .............................. 2009139982/22

(51) Int. Cl.
*E04C 2/34* (2006.01)

(52) U.S. Cl. ..................... 52/790.1; 52/586.1; 144/353

(58) Field of Classification Search ................ 52/797.1, 52/796.12, 796.1, 790.1, 800.1, 586.1, 592.6, 52/585.1, 590.2, 590.1; 428/120, 179, 223; 144/353

See application file for complete search history.

(56) References Cited

U.S. PATENT DOCUMENTS

| | | | | |
|---|---|---|---|---|
| 422,851 A * | 3/1890 | Thompson et al. | .......... | 52/797.1 |
| 1,467,340 A * | 9/1923 | Siegel | .......................... | 52/582.1 |
| 1,507,813 A * | 9/1924 | Carter | .......................... | 52/586.1 |
| 2,104,307 A * | 1/1938 | Miller | ............................ | 144/354 |
| 2,869,355 A * | 1/1959 | Bowlden | .......................... | 52/422 |
| 3,837,985 A * | 9/1974 | Chase | .............................. | 428/223 |
| 4,350,728 A * | 9/1982 | Huang et al. | .................... | 428/105 |
| 6,534,143 B1* | 3/2003 | Thoma | ............................ | 428/44 |
| 7,331,270 B2* | 2/2008 | Booher | .......................... | 89/36.02 |
| 2010/0326011 A1* | 12/2010 | Norling et al. | ................ | 52/796.1 |

FOREIGN PATENT DOCUMENTS

| | | |
|---|---|---|
| RU | 2198271 | 10/2003 |
| RU | 59 096 | 10/2006 |
| RU | 2 354 788 | 10/2009 |

* cited by examiner

*Primary Examiner* — Christine T Cajilig
(74) *Attorney, Agent, or Firm* — Hayes Soloway P.C.

(57) ABSTRACT

A multi-layer wood panel comprises a core segment, made up of a plurality of layers, and two external finishing layers. Each layer is comprised of several boards, joined at the edges with interlocking fingers or tongues and grooves. The layers of the core segment are joined using wood pegs at specified intervals, with the pegs penetrating all the board layers of the core segment at an angle other than perpendicular to the layers. The core segment and the external finishing layers of the panel are joined using key and groove mortise connections, where the key shape corresponds to the shape of the mortise grooves made in the outer surfaces of the boards of the core segment and in the inner surfaces of the outer finishing layer, which are oriented perpendicular or parallel to the direction of the board fibers.

15 Claims, 1 Drawing Sheet

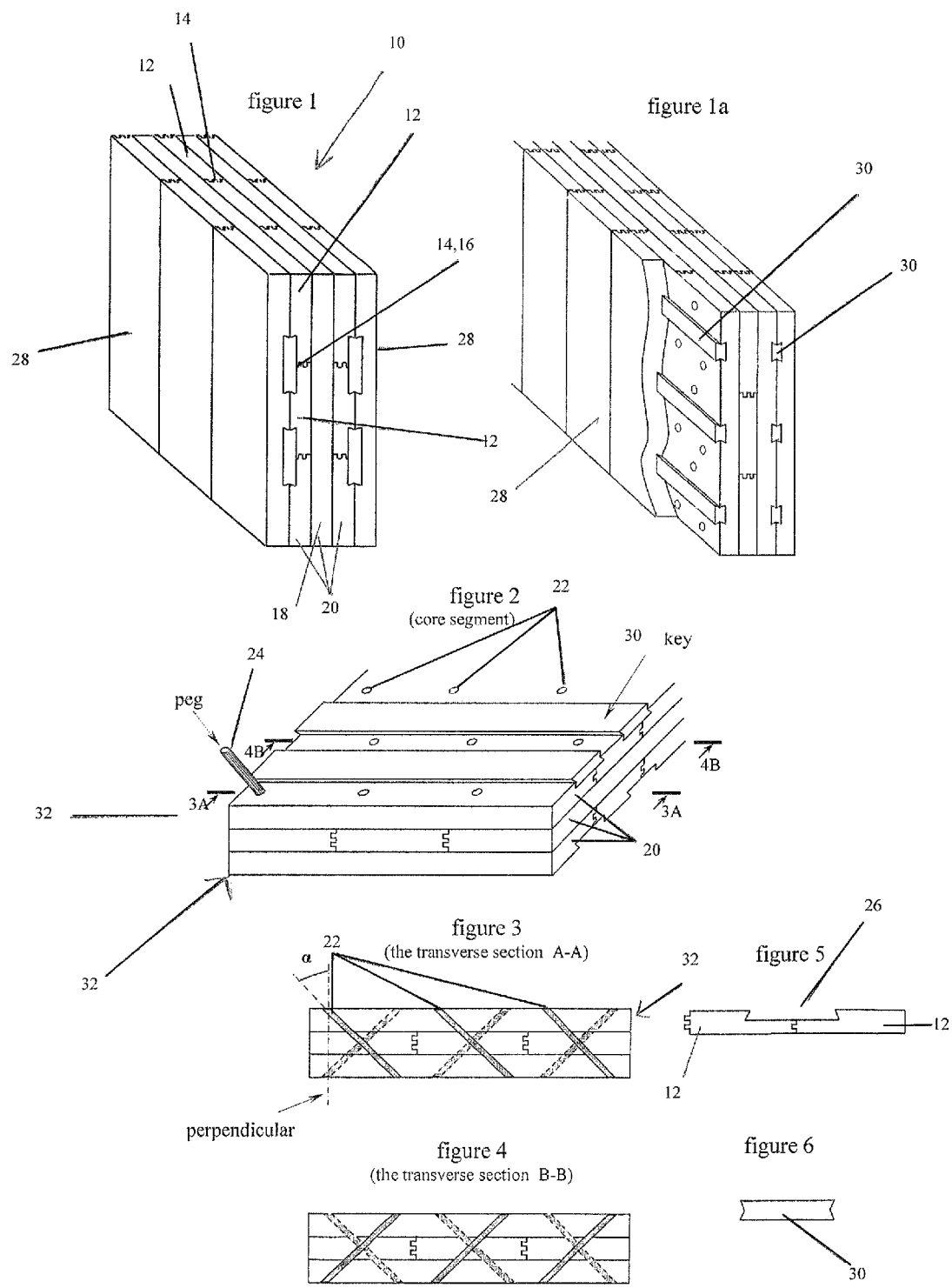

SYSTEM AND METHOD FOR CONSTRUCTION WALL PANELS

CROSS REFERENCE TO RELATED APPLICATION

This application claims priority to Russian Patent No. 92053, filed Oct. 30, 2009.

BACKGROUND

1. Field

The invention relates to a system and method of constructing wall panels for use generally in the construction industry, and can be used in individual housing construction to make wall panels for exterior and interior walls as well as for ceiling coverings.

2. Description of Related Art

Wood can be used to construct almost any part of a home from the roofing and exterior walls to the floor and interior architectural elements as well as basic domestic items like furniture and cabinets. However, in recent years the cost of solid timber wood has increased dramatically as its supply shrinks due to the gradual depletion of old-growth and virgin forests. Indeed, it is particularly expensive to manufacture solid hardwood furniture and architectural features from such material because typically less than half of harvested timber wood is converted to natural solid wood lumber, the remainder being discarded as scrap. In the building context, wood panels may be too small to cover large wall areas and wooden structures composed of multiple smaller, mass produced, timber components are desirable.

Compared to solid wood panels, such assembled wood panels have advantages. For example, assembled wood panels can be produced having a desired surface area that is not limited by the diameter of the trunk of a tree. Basically, any limitations with regard to the size of the surface area of the composite panel arise only from problems in handling the panels. Furthermore, assembled wood panels demonstrate superior strength properties compared to normal solid wood boards that are not glued because, by transverse gluing of the boards, the direction-dependent strength properties of wood can be partially compensated and, as a result, changes of board shape due to the influence of environmental factors, like moisture, can be kept within prescribed limits.

While useful for at least these reasons, typical assembled wood panels have their own deficiencies. RU 59096 provides wood sandwich panels for construction of holiday cottages. The panels contain a supporting framework made of timber with more attractive facing on an external surface and an internal surface. The supporting framework consists of inner and outer rectangular frames of equal external dimension, where one of the timbers of the long side of the frame is wider than the timbers of the other sides. The frames are mutually offset by width and are joined into one piece, forming projections for joining to other panels. The external frame has a load-bearing element mounted along its length, while the internal frame has at least three load-bearing elements mounted along its width. These load-bearing elements are typically made of timbers whose ends are attached to the frames. Due to the method of joining the various layers, additional layers of thermal insulation, waterproofing materials, and a vapor barrier are required. There is a layer of waterproofing between the inner frame and inner facing, and a vapor barrier between the outer frame and outer facing. The space between them is filled with thermal insulation. Facing is typically fabricated of wood tile and the projections for joining to other panels are covered with foamed polyethylene strip sealant.

Among the disadvantages of sandwich panels currently in use is poor air permeability caused by the presence of waterproofing and the vapor barrier. This requires supplemental humidity control within the premises of a building, because the humidity in houses with poor ventilation is always higher than in houses with normal and natural ventilation. This makes dampness, mold and rot more likely in wooden house elements, and may adversely impact inhabitant health. In addition, panels currently in use are characterized by thermal lag, inherent to the panel design, owing to the low thermal capacity of the minerals used in the basic framework volume (principally, the mineral batting). Such minerals insulate the premises from loss of heat in cold months, but in summer they are unable to relieve the house of heat.

Wood and metal composite panels such as described in RU 2354788 also are currently in use, which contain a cellular wood-and-metal framework formed by longitudinal and transverse wood boards that are joined using U-shaped metal frames that repeat their configuration and grip the boards by both sides. Stiffeners in the form of flat plates are attached to the frames at framework cell joints. The panel contains facing and a layer of waterproofed thermal insulation as well. This wood-and-metal composite panel also exhibits the aforementioned disadvantages, which are caused by the layer of waterproofed thermal insulation.

RU 2198271 describes another framing structure that contains at least three bonded layers of wood components mounted alongside each other and fabricated in the shape of boards or bars. The wood components of at least two layers are oriented in different directions. Separate layers are joined using pegs that penetrate the wood component layers. Such a design eliminates some of the aforesaid disadvantages of prior art panels. At the same time, such prefabricated units have shortcomings of their own. One of these concerns the fact that pegs completely penetrate the prefabricated unit, thus resulting in a need to apply additional finishing material. Such prefabricated unit also tend to exhibit higher air permeability. In addition, in use, such prefabricated panels are prone to structural loosening.

BRIEF SUMMARY

The present invention provides among other things, a multi-layer wood panel that overcomes the aforementioned and other disadvantages of the prior art. The technical result is reduced cost for finishing materials, reduced air permeability, and increased structural strength.

The invention provides a novel multi-layer wood method of creating a multi-layer wood panel that is securely and efficiently fastened. A multi-layer wood panel in accordance with the present invention comprises a core segment, made up of a plurality of layers, and two external finishing layers. Each layer is comprised of several boards, joined at the edges with interlocking finger or tongue and groove connections. The plurality of layers of the core segment are joined using wood pegs at specified intervals, with the pegs penetrating the board layers of the core segment at an angle other than perpendicular to the layers. The core segment and the external finishing layers of the panel are joined using keyed mortise and joint connections, where the key shape corresponds to the shape of key grooves made in the outer surfaces of the boards of the core segment and in the inner surfaces of the outer finishing layer, which are oriented perpendicular or parallel to the direction of the board fibers, and have a trapezoid cross section with the wide base embedded in the body of the layer.

The layers of the core segment are made of timber, preferably from coniferous species, preferably dried to a first moisture content, preferably about 6 to 18%, more preferably about 18%. Pegs and keys preferably are made of hardwood timber, for example, beech, birch or oak, preferably dried to a moisture second content different from and lower than the first moisture content, preferably about 6 to 10%, more preferably about 10%. Pegs axes should be oriented in several parallel planes, so that the pegs axes in one plane are parallel to each other and not parallel to the pegs axes in adjacent parallel planes.

Fabricating layers from tongue and groove or interlocking finger connected boards reduces the air permeability of the panel. Orienting the fibers of adjacent layers perpendicular to each other, and placing pegs at an angle to the layers of the boards reduces the likelihood of product loosening during use. Using keyed connections to join the core segment with the outer finishing layers reduces panel finishing costs. Additional suggestions related to the material of panel components and their moisture level gives an opportunity to create additional force closure resulting from increased pegs and keys volume after equalization of moisture levels in wooden parts.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 1 is a perspective view, and FIG. 1A a perspective view in partial cross-section, illustrating a panel made in accordance with the present invention;

FIG. 2 is a perspective view of the core segment of a panel in accordance with the present invention, with the keys and the pegs, without the outer finishing layers;

FIGS. 3 and 4 are sectional views taken along 3A-3A and 4B-4B, respectively of the core segment of FIG. 2;

FIG. 5 is a cross-sectional of the mortise groove in the assembled boards of a layer;

FIG. 6 is a cross-sectional view of the key of an embodiment of the invention;

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In one application of the invention, the panel is assembled as follows: a layer is fabricated or assembled from component parts. The component parts of the layer may be, for example, individual boards 12 of mass produced lumber. The lumber boards 12 of each layer are connected at the edges 13 with interlocking fingers or tongues 14 and fingers or grooves 16. The edges 13 of adjacent lumber panels are configured such that the fingers or tongues 14 of one board 12 fit into the fingers or grooves 16 of the adjacent panel 12, and vice versa. Preferably, the fingers or tongues 14 and fingers or grooves 16 should extend the entire length of the edge 13 of the wood panel 12. A core segment 18 is constructed of a plurality of core layers 20. The layers of the core segment should be made of timber, preferably from coniferous species. If desired, the core segment may be composed of a less expensive composite material.

The grain patterns in adjacent layers 20 preferably are oriented substantially perpendicular to each other. Then, peg holes 22 are drilled in the core segment at an angle $\alpha$ that is an angle other than perpendicular to the plane of the layers, preferably between 20° and 45°, more preferably about 45°. In one embodiment, the peg holes 22 each have a different angle $\alpha$. Alternatively, peg holes 22 may be spaced in columns 32 and rows 34, where the angle $\alpha$ or holes in a given row 32 are the same, and the angles $\alpha$ of adjacent rows 32 are substantially different from each other, as shown in FIGS. 3 and 4.

Pegs 24 having a cross-sectional shape very nearly matching the shape of the drilled holes are hammered into the drilled holes and cut flush with the outer surface of the core segment. Key mortise grooves 26 of a substantially trapezoid shape are then cut in the outer surfaces of the core segment 18. The key mortise grooves 26 are widest at the plane furthest from the surface of the core segment, and narrows gradually as it approaches the surface of the core segment. Similar mortise grooves 26 are cut into the inner surface of the finishing layers 28. Preferably, the mortise grooves 26 spans across two lumber boards 12 of a layer 20. Shaped keys 30, having cross-sectional shapes configured to match the shape of the cut mortise groove, and a matching mortise groove 26 in finishing layer 28, are inserted in the mortise grooves to couple the core segment to the finishing layers 28.

Finishing layers 28 are constructed similarly to each layer of the core segment. Lumber boards 12 are connected at the edges 13 with interlocking fingers or tongues and grooves 14 and 16. The finishing layer may be of a more handsome or expensive wood than core segment 18. Grooved finishing layers 28 have a mortise groove 26 cut into one surface. The finishing layers 28 may be assembled to the core segment 18 by sliding the key 30 into the mortise groove 26 on the core segment 18 and then sliding the finishing layer 28 onto the key 30. Alternatively, the outer surface of the core segment 18 may be placed adjacent to the inner surface of the finishing layer 28 and the key 30 inserted into the mortise grooves 26 of both layers 18 and 28 simultaneously. The surface of the finishing layers 28 opposite the surface in which the mortise grooves are cut may be uniformly smooth or have some other desired pattern or texture. Finishing layers may be polished once assembled if necessary.

The timber used to assemble the layers of the panel are preferably dried to a first moisture content preferably of about 6 to 18%, more preferably about 18%. Pegs and keys should be made of hardwood timber, for example, beech, birch or oak, dried to a second moisture content lower than the first moisture content, preferably about 6 to 10%, more preferably about 10%, to allow for some swelling of the pegs and keys to create additional force closure resulting from increased pegs and keys volume after equalization of moisture levels in the various wooden parts.

It should be understood that many changes, modifications, variations and other uses and applications will become apparent to those skilled in the art after considering the specification and the accompanying drawings. Therefore, any and all such changes, modifications, variations and other uses and applications which do not depart from the spirit and scope of the invention are deemed to be covered by the invention.

We claim:

1. A multilayer panel comprising:
   a plurality of layers, wherein each layer is comprised of a plurality of boards, and wherein the boards are coupled to each other with interlocking fingers or tongues and grooves;
   a core segment having an inside planar surface and an outside planar surface with each surface of the core segment having a plurality of mortise grooves cut thereinto, wherein the core segment is comprised of a plurality of the layers, a plurality of continuous holes drilled through the inside surface, the outside surface, and the plurality of the layers, and a peg inserted into each hole;
   an inside facing layer having an inner surface and an outer surface and a plurality of mortise grooves cut into the inner surface of the inside facing layer spaced to correspond to the mortise grooves cut into the inside surface of the core segment;
   an outside facing layer having an inner surface and an outer surface and a plurality of mortise grooves cut into the inner surface of the outside facing layer spaced to correspond to the mortise grooves cut into the outside surface of the core segment;
   a plurality of inside keys configured to be inserted into the mortise grooves of the inside surface of the core segment and the mortise grooves of the inside facing layer whereby to couple the inside facing layer to the inside surface of the core segment; and
   a plurality of outside keys configured to be inserted into the mortise grooves of the outside surface of the core segment and the mortise grooves of the outside facing layer whereby to couple the outside facing layer to the outside surface of the core segment.

2. The panel of claim 1, wherein the pegs are flush with the inside and outside surfaces of the core segment.

3. The panel of claim 1, wherein the pegs are substantially the same shape as the continuous holes.

4. The panel of claim 1, wherein the plurality of continuous holes are configured in rows, wherein the angle of the holes of each row relative to a line perpendicular to the plane of the surface of the core segment are the same, and wherein the angle of holes in adjacent rows are substantially different from each other.

5. The panel of claim 4, wherein the angles of holes in adjacent rows are perpendicular to each other.

6. The panel of claim 1, wherein the plurality of continuous holes each has an angle relative to a line perpendicular to the plane of the surface of the core segment that is substantially different from the angle of any adjacent holes.

7. The panel of claim 1, wherein the mortise grooves are uniform and symmetrical.

8. The panel of claim 1, wherein the mortise grooves of the inside surface of the core segment and the mortise grooves of the inside facing layer have the same shape and dimensions, wherein the mortise grooves of outside surface of the core segment and the mortise grooves of the outside facing layer have the same shape and dimensions, and wherein the mortise grooves of the inside surface of the core segment and the mortise grooves of the inside facing layer have a different shape or dimensions than the mortise grooves of the outside surface of the core segment and the mortise grooves of the outside facing layer.

9. The panel of claim 1, wherein the mortise grooves are of a substantially trapezoid shape.

10. The panel of claim 1, wherein the boards, keys, and pegs are made of wood, and wherein the keys and pegs have a moisture content less than the moisture content of the boards when the panel is assembled, such that the pegs and the keys expand as the moisture level in the wooden parts equalizes.

11. The panel of claim 10, wherein the keys and pegs have a moisture content of 6 to 18%, and the boards have a moisture content of 6 to 10%.

12. The panel of claim 1, wherein the layers are comprised of wood and wherein the wood grains of adjacent layers are substantially perpendicular.

13. A method of assembling a multi-layered panel, comprising the acts of:
   assembling a plurality of layers, wherein each layer is comprised of a plurality of boards, and wherein the boards are coupled to each other with interlocking fingers or tongues and grooves;
   stacking a plurality of the assembled layers;
   drilling a plurality of holes in the stacked plurality of assembled layers at an angle relative to a line perpendicular to the plane of the surface of the stack;
   providing a plurality of pegs and placing the pegs in each of the plurality of holes;
   forming a plurality of mortise grooves in each surface of the stacked layers;
   forming a plurality of mortise grooves corresponding to the mortise grooves in the surfaces of the stacked layers in an inside layer and an outside layer; and
   coupling the inside layer and the outside layer to the surfaces of the stacked layers with a key corresponding to a shape of the cut mortise grooves.

14. The method of claim 13, wherein the layers are comprised of wood and wherein the plurality of the assembled layers that are stacked are stacked with the wood grains of adjacent layers being substantially perpendicular.

15. The method of claim 13, further comprising the step of cutting the pegs so they are flush with the surfaces of the stacked layers.

* * * * *